No. 679,253. Patented July 23, 1901.
A. H. COWLES.
PROCESS OF OBTAINING VOLATILE ELEMENTS FROM THEIR COMPOUNDS.
(Application filed July 19, 1900.)
(No Model.)
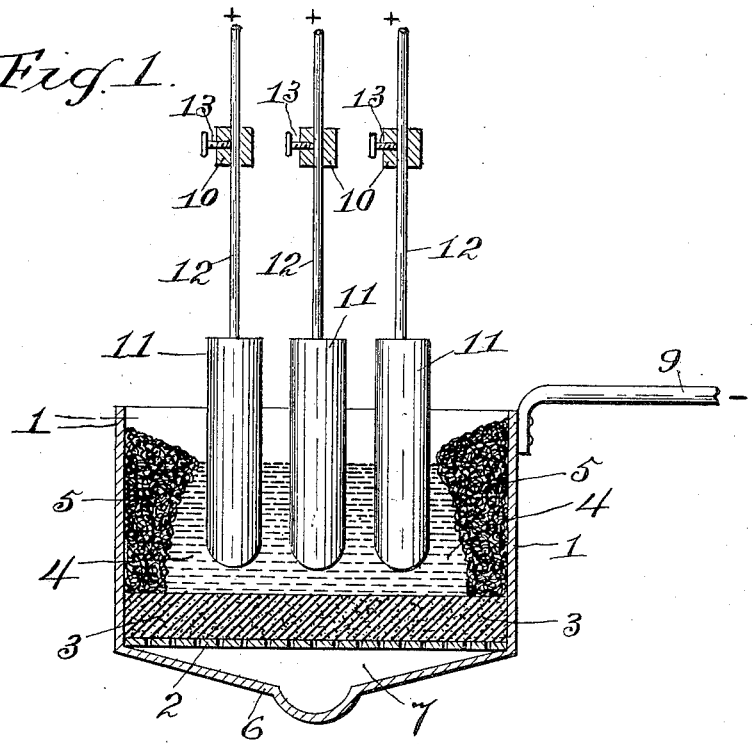
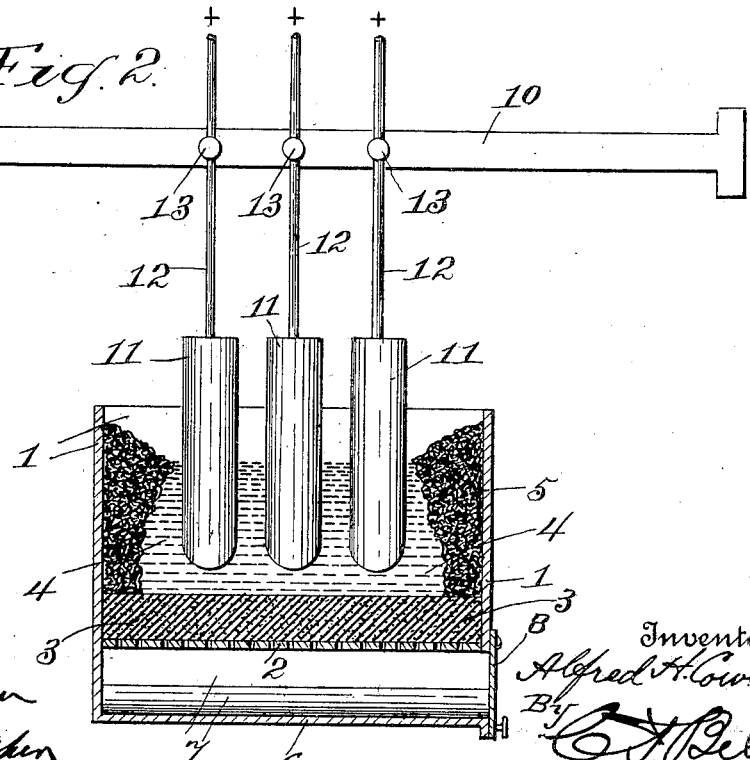

UNITED STATES PATENT OFFICE.

ALFRED H. COWLES, OF CLEVELAND, OHIO, ASSIGNOR TO THE ELECTRIC SMELTING AND ALUMINUM CO., OF SAME PLACE.

PROCESS OF OBTAINING VOLATILE ELEMENTS FROM THEIR COMPOUNDS.

SPECIFICATION forming part of Letters Patent No. 679,253, dated July 23, 1901.

Application filed July 19, 1900. Serial No. 24,198. (No specimens.)

*To all whom it may concern:*

Be it known that I, ALFRED H. COWLES, a citizen of the United States, residing at Cleveland, in the county of Cuyahoga and State of Ohio, have invented certain new and useful Improvements in Processes of Obtaining Volatile Elements from their Ores or Compounds by Electric Smelting, of which the following is a specification.

This invention relates to electric smelting, and particularly to a process for obtaining volatile elements from their ores or compounds by electric smelting; and it consists of a process of effecting the reduction of minerals or other compound chemical substances while in a state of fusion by the electrolytic action of an electric current, it being especially applicable for the extraction of volatile elements—such as sodium, potassium, zinc, and phosphorus—from fused compounds or mixtures containing them; and it further consists of a method of catching and condensing said products after electrolytically depositing them in a gaseous or vaporous condition.

In the accompanying drawings, forming part of this application, Figure 1 is a cross-section of the apparatus. Fig. 2 is a longitudinal section of the apparatus.

The same numeral references denote the same parts in both views of the drawings.

An apparatus best suited for carrying out the process consists of an iron receptacle 1, having a perforated bottom 2, upon which rests a porous cathode 3, of carbon or other suitable material. The receptacle contains a bath 4 of fused material, which is surrounded by a body of like unfused material 5, forming a wall or lining for the receptecle 1. An air-tight false bottom 6 depends from the receptacle 1 and forms a condensing-chamber 7, having a door 8, through which the products are tapped off or removed from the chamber. A negative terminal 9 of an electric circuit is attached to the receptacle 1 and through the metallic walls of the receptacle is electrically connected with the porous cathode 3. Positive terminals 10 of the same circuit are electrically connected with positive electrodes 11 by metal rods 12, which may be adjusted by set-screws 13 to alter or vary the resistance which the fused bath will offer to an electric current. The positive electrodes 11 are composed of carbon or other suitable material, which may collectively be looked upon as an anode. The perforations in the bottom 2 permit the vapors to pass from the cathode 3 into the condensing-chamber 7. The use of walls of unfused material of this nature is not essential to the process, but permitting this material, which is of the same nature as the material of the fused bath, to solidify on the walls of the receptacle protects them against the corrosive action of the bath and also confines the heat that is necessarily generated by the flow of the electric current within the bath.

I will now proceed to describe the invention as applied to the extraction of sodium from one of its compounds, such as soda caustic, soda carbonate, or sodium chlorid, or other suitable compound of sodium. The bath 4 is prepared, from which metallic sodium will deposit as a vapor. In order to accomplish this, the temperature of the fused bath (when in operation) must be higher than the volatilizing temperature of the sodium. Such a bath may be secured from many mixtures or even from simple haloid salts of sodium. A mixture that I have used successfully consists of the fluorid of sodium and the fluorid of aluminium containing, preferably, an excess of the former, for if it contains too much fluorid of aluminium such salt will be decomposed with liberation of aluminium ahead of the sodium. A bath formed of this mixture fuses at a dull-red heat well above the vaporizing temperature of metallic sodium. If to this bath an oxygen compound of sodium, for example, soda carbonate, be added, the electrolytic action of the current will be such as to decompose this compound, liberating oxygen at the anodes 11 and vapor of sodium into the cathode 3. The electrodes 11 should be so adjusted that the conductive resistance of the bath 4 will cause with a comparative strong flow of current sufficient heat to maintain the bath at a constant and steady temperature. Altering the electric pressure or voltage of the dynamo employed in the circuit may alter or vary the heat delivery to the bath. Hence by either governing the electric generator or raising or lowering the electrodes 11 the temperature of the bath may be controlled and regulated and the amount of the material within the receptacle 1 that remains fused may be controlled. The cathode 3 may be formed of carbon of a somewhat porous nature. This can be accomplished by packing in the bottom of the receptacle 1 a mixture of coke, granular powder, and coal-tar or pitch and slowly baking the same till the hydrocarbon gases are driven off. When the bath 4 is maintained hotter than the volatilizing temperature of sodium, the vapor of sodium electrically deposited against this porous mass (the cathode 3) cannot remain permanently within its pores, but it will penetrate the same until it reaches a cooler place, where it will condense in the condensing-chamber 7. The oxygen of the oxygen compound passes to the divided anode 11, and if the same be formed of carbon rods it burns them and bubbles out of the bath as carbonic-oxid gas, which burns to carbonic acid as it comes in contact with the air. In this case the energy of the combination of carbon and oxygen is alone about sufficient to decompose the oxygen-sodium compound being operated upon, for this combustion of the carbon anode tends to produce an electric current in the same direction as the electrolyzing-current employed, and thereby reinforces such current. The energy from the electric generator is only that which is needed to overcome the conductive resistance of the circuit while the bath or baths are maintained fused at a proper temperature. I have found by experience that in a receptacle employing a bunch of about twenty carbon rods, each two and one-half inches in diameter, as anode-rods a current of about three thousand amperes requires about five volts pressure to maintain the bath properly fused. With larger apparatus the voltage absorbed in a pot becomes less, and thereby electrically more economical. As the sodium compound charged to the bath 4 becomes exhausted fresh material is added and stirred into the bath. In operating, the workmen soon become skilled, and from the appearance of the bath and the burning of the anodes and by observing electrical instruments in the circuit they can tell when new additions of the sodium compound are called for and when the old additions have become exhausted in the bath. When the condenser becomes well filled with liquid or solid sodium, the same may be removed through the door 8 by suitable tools. By applying the heat of fire the temperature of the condenser 7 may be so regulated that the deposited element will collect as a liquid, which is a preferable form to which to condense the same. When thus maintained as a liquid, it settles to the bottom of the condensing-chamber and does not clog the apparatus and may be removed by tapping. It is essential that the condensing-chamber should have no admission of air when the process is in operation.

Although I have described the invention in its application to the reduction of an oxygen compound of sodium from a fused bath formed of sodium fluorid and aluminium fluorid, I do not wish to be understood as limiting myself to any such compounds, as the method or process I employ is applicable to many different volatile elements, all that is necessary being to observe that the compound operated upon shall under electrolysis liberate the volatile element sought for and when fused it shall be maintained at a temperature well above the volatilizing temperature of the element sought. Then by employing the condenser in conjunction with a porous cathode the element may be obtained.

Having thus described my invention, what I claim as new, and desire to secure by Letters Patent, is—

1. The herein-described process of obtaining a volatile electropositive element from its ores or compounds, which consists in passing an electric current through a fused mass of such ore or compound to a porous cathode, thereby depositing such element on the cathode, maintaining the element in a state of vapor, and causing the vapor to pass through the cathode and condensing it.

2. The herein-described process, which consists in electrolytically extracting a volatile electropositive element from a fused bath containing the same, which bath is maintained at a temperature higher than the volatilizing temperature of the element, depositing the element against a porous cathode, passing the element as vapor through the cathode, and condensing it.

3. The herein-described process which consists in electrodepositing metallic sodium from an electrolytic bath maintained at a temperature above the volatilizing temperature of sodium, upon a porous cathode, maintaining the sodium in a state of vapor, passing the vapor through the pores of the cathode, and condensing it.

In witness whereof I hereunto set my hand in the presence of two witnesses.

ALFRED H. COWLES.

Witnesses:
NELLIE J. WILLS,
CHARLES P. ADAMS.